(12) United States Patent
Druml

(10) Patent No.: US 12,210,122 B2
(45) Date of Patent: Jan. 28, 2025

(54) MIRROR MOVEMENT AND LASER SHOOT PATTERN COMPENSATION FOR FREQUENCY-MODULATED CONTINOUS-WAVE (FMCW) LIDAR

(71) Applicant: Infineon Technologies AG, Neubiberg (DE)

(72) Inventor: Norbert Druml, Graz (AT)

(73) Assignee: Infineon Technologies AG, Neubiberg (DE)

( * ) Notice: Subject to any disclaimer, the term of this patent is extended or adjusted under 35 U.S.C. 154(b) by 1098 days.

(21) Appl. No.: 17/003,154

(22) Filed: Aug. 26, 2020

(65) Prior Publication Data

US 2022/0065995 A1 Mar. 3, 2022

(51) Int. Cl.
  *G01S 7/481* (2006.01)
  *G01S 7/4911* (2020.01)
  *G01S 17/34* (2020.01)

(52) U.S. Cl.
  CPC .......... *G01S 7/4817* (2013.01); *G01S 7/4911* (2013.01); *G01S 17/34* (2020.01)

(58) Field of Classification Search
  None
  See application file for complete search history.

(56) References Cited

U.S. PATENT DOCUMENTS

| | | |
|---|---|---|
| 4,721,385 A | 1/1988 | Jelalian et al. |
| 2016/0377722 A1 | 12/2016 | Lardin et al. |
| 2019/0101628 A1 * | 4/2019 | Roger .................. G01S 17/42 |
| 2019/0154832 A1 | 5/2019 | Maleki et al. |
| 2020/0200879 A1 | 6/2020 | Hallstig et al. |
| 2023/0341523 A1 * | 10/2023 | Gao .................. G02B 26/105 |

FOREIGN PATENT DOCUMENTS

| | | | | |
|---|---|---|---|---|
| CN | 110531341 A | * | 12/2019 | ........ G01S 7/4817 |
| DE | 102020134851 A1 | | 6/2022 | |

* cited by examiner

*Primary Examiner* — Luke D Ratcliffe
*Assistant Examiner* — Sanjida Naser
(74) *Attorney, Agent, or Firm* — Harrity & Harrity, LLP

(57) ABSTRACT

A scanning system includes a transmitter, a scanning structure, and a controller. The transmitter is configured to transmit a frequency modulated continuous wave (FMCW) light beam that includes a plurality of frequency ramps including up-chirps and down-chirps that are matched into up-down chirp pairs. The scanning structure is configured to oscillate about a scanning axis such that a deflection angle of the scanning structure continuously varies over time in an angular range between two maximum deflection angles. The controller is configured to segment the angular range into a plurality of sub-angular ranges and assign each up-down chirp pair to a different sub-angular range of the plurality of sub-angular ranges. Each up-down chirp pair includes an up-chirp transmitted in an assigned sub-angular range during a first scanning movement of the scanning structure and a down-chirp transmitted in the assigned sub-angular range during a second scanning movement of the scanning structure.

24 Claims, 6 Drawing Sheets

MIRROR MOVEMENT AND LASER SHOOT PATTERN COMPENSATION FOR FREQUENCY-MODULATED CONTINOUS-WAVE (FMCW) LIDAR

BACKGROUND

Light Detection and Ranging (LIDAR), is a remote sensing method that uses light in the form of a pulsed laser to measure ranges (variable distances) to one or more objects in a field of view. In particular, a microelectromechanical system (MEMS) mirror is used to scan light across the field of view. Arrays of photodetectors receive reflections from objects illuminated by the light, and the time it takes for the reflections to arrive at various sensors in the photodetector array is determined. This is also referred to as measuring time-of-flight (ToF). LIDAR systems form depth measurements and make distance measurements by mapping the distance to objects based on the time-of-flight computations. Thus, the time-of-flight computations can create distance and depth maps, which may be used to generate images.

For continuous wave modulation, such as that used for a frequency-modulated continuous-wave (FMCW) beam, a detected wave after reflection has a shifted frequency and/or phase, and the shift is proportional to distance from reflecting object or surface. Thus, the distance can be determined from the measured shift. This is in contrast to pulsed modulation, in which a system measures distance to a 3D object by measuring the absolute time a light pulse takes to travel from a source into the 3D scene and back, after reflection.

However, issues arise when implementing continuous scanning of a FMCW beam due to the changing frequency (wavelength) of the beam in combination with the continuous scanning motion of the MEMS mirror. Continuously shooting lasers (FMCW) and fast continuously moving mirrors/scanners will result in a reduced resolution that depends on the movement speed of the MEMS mirror. In addition, some FMCW LIDAR systems require both up-chirp and down-chirp FMCW beams. Both up and down-chirps have to hit the same target to calculate the speed and distance of the target. One chirp may require 5 us to transmit its full frequency range (also referred to as a frequency sweep or a wavelength sweep). As a consequence, the target needs to be hit for at least 10 us when taking into account the need for an up-chirp and a down-chirp. As a consequence, the faster the scanning frequency, the lower the resolution of the FMCW system.

Therefore, an improved FMCW LIDAR system that can compensate for the movement speed (e.g., scanning frequency) of the MEMS mirror may be desirable.

SUMMARY

One or more embodiments provide a scanning system, including: a transmitter configured to transmit a frequency modulated continuous wave (FMCW) light beam into a field of view, wherein the FMCW light beam includes a plurality of frequency ramps that have a chirp rate that is variable; a scanning structure configured to rotate about a scanning axis such that a deflection angle of the scanning structure continuously varies over time, wherein the scanning structure is configured to scan the field of view with the FMCW light beam; a measurement circuit configured to measure the deflection angle of the scanning structure as the deflection angle varies over time and generate position information based on the measured deflection angle; and a controller configured to vary the chirp rate of the plurality of frequency ramps based on the position information.

One or more embodiments provide a method of compensating a scanning system, including: transmitting a frequency modulated continuous wave (FMCW) light beam into a field of view, wherein the FMCW light beam includes a plurality of frequency ramps having a chirp rate that is variable; driving a scanning structure to rotate about a scanning axis such that a deflection angle of the scanning structure continuously varies over time, wherein the scanning structure is configured to scan the field of view with the FMCW light beam; measuring the deflection angle of the oscillator structure as the deflection angle varies over time; generating position information based on the measured deflection angle; and varying the chirp rate of the plurality of frequency ramps based on the position information.

One or more embodiments provide a scanning system, including: a transmitter configured to transmit a frequency modulated continuous wave (FMCW) light beam into a field of view, wherein the FMCW light beam includes a plurality of frequency ramps including up-chirps-and down-chirps that are matched into up-down chirp pairs, each up-down chirp pair including one up-chirp and one down-chirp; a scanning structure configured to oscillate about a scanning axis such that a deflection angle of the scanning structure continuously varies over time, wherein the scanning structure is configured to oscillate in an angular range between a first maximum deflection angle and a second maximum deflection angle; and a controller configured to segment the angular range into a plurality of sub-angular ranges and assign each up-down chirp pair of the FMCW light beam to a different sub-angular range of the plurality of sub-angular ranges, wherein each up-down chirp pair includes an up-chirp transmitted in an assigned sub-angular range during a first scanning movement of the scanning structure and a down-chirp transmitted in the assigned sub-angular range during a second scanning movement of the scanning structure.

One or more embodiments provide a method of compensating a scanning system, including: transmitting, by a transmitter, a frequency modulated continuous wave (FMCW) light beam into a field of view, wherein the FMCW light beam includes a plurality of frequency ramps including up-chirps and down-chirps that are matched into up-down chirp pairs, each up-down chirp pair including one up-chirp and one down-chirp; driving a scanning structure to oscillate about a scanning axis such that a deflection angle of the scanning structure continuously varies over time, wherein the scanning structure is configured to oscillate in an angular range between a first maximum deflection angle and a second maximum deflection angle; segmenting the angular range into a plurality of sub-angular ranges; assigning each up-down chirp pair of the FMCW light beam to a different sub-angular range of the plurality of sub-angular ranges, wherein each up-down chirp pair includes an up-chirp transmitted in an assigned sub-angular range during a first scanning movement of the scanning structure and a down-chirp transmitted in the assigned sub-angular range during a second scanning movement of the scanning structure; and controlling the transmitter to transmit each up-down chirp pair at their assigned sub-angular range.

BRIEF DESCRIPTION OF THE DRAWINGS

Embodiments are described herein making reference to the appended drawings.

DETAILED DESCRIPTION

Figure 1:
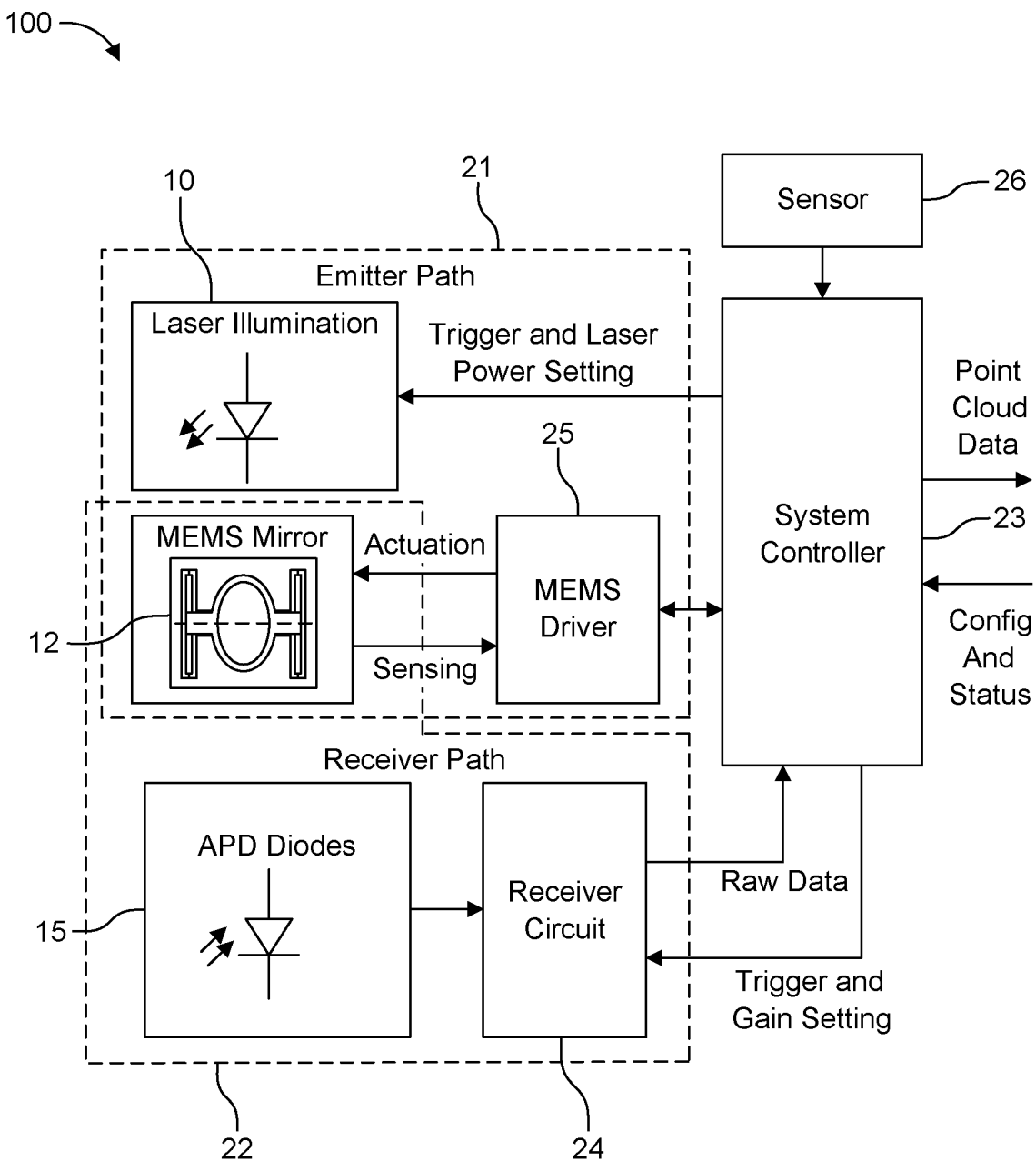
FIG. 1 is a schematic block diagram of a LIDAR scanning system in accordance with one or more embodiments.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

Embodiments relate to optical sensors and optical sensor systems and to obtaining information about optical sensors and optical sensor systems. A sensor may refer to a component which converts a physical quantity to be measured to an electric signal, for example a current signal or a voltage signal. The physical quantity may, for example, comprise electromagnetic radiation, such as visible light, infrared (IR) radiation, or other type of illumination signal, a current, or a voltage, but is not limited thereto. For example, an image sensor may be a silicon chip inside a camera that converts photons of light coming from a lens into voltages. The larger the active area of the sensor, the more light that can be collected to create an image.

A sensor device as used herein may refer to a device which comprises a sensor and further components, for example biasing circuitry, an analog-to-digital converter or a filter. A sensor device may be integrated on a single chip, although in other embodiments a plurality of chips or also components external to a chip may be used for implementing a sensor device.

In frequency-modulated continuous-wave (FMCW) Light Detection and Ranging (LIDAR) systems, a light source continuously transmits an FWCM light beam into a field of view and the light reflects from one or more objects by backscattering. In particular, an FWCM LIDAR is an indirect Time-of-Flight (ToF) system during which the frequency or wavelength of a transmitted light beam is continuously swept between a minimum value and a maximum value that define a predefined frequency/wavelength range or band. For example, the frequency or wavelength of the transmitted light beam may be modulated according to a triangle-wave modulation pattern comprised of a series of frequency or wavelength ramps.

A scan, such as an oscillating horizontal scan (e.g., from left to right and right to left of a field of view), an oscillating vertical scan (e.g., from bottom to top and top to bottom of a field of view), or a Lissajous scan (e.g., according to a Lissajous scanning pattern that employs two scanning axes) can illuminate a scene in a continuous scan fashion. By emitting successive frequency chirps while continuously shooting the laser in different scanning directions, an area referred to as the field of view can be scanned and objects within the area can be detected and imaged. Thus, the field of view represents a scanning plane having a center of projection. A raster scan or omnidirectional scanning could also be used.

FIG. 1 is a schematic block diagram of a LIDAR scanning system 100 in accordance with one or more embodiments. The LIDAR scanning system 100 includes a transmitter unit 21 that is responsible for an emitter path of the system 100, and a receiver unit 22 that is responsible for a receiver path of the system 100. The system also includes a system controller 23 that is configured to control components of the transmitter unit 21 and the receiver unit 22, and to receive raw data from the receiver unit 22 and perform processing thereon (e.g., via digital signal processing) for generating object data (e.g., point cloud data). Thus, the system controller 23 includes at least one processor and/or processor circuitry (e.g., comparators, TDCs, ADCs, and digital signal processors (DSPs)) of a signal processing chain for processing data, as well as control circuitry, such as a microcontroller, that is configured to generate control signals. The LIDAR scanning system 100 may also include a sensor 26, such as a temperature sensor, that provides sensor information to the system controller 23.

The transmitter unit 21 includes an illumination unit 10, a MEMS mirror 12, and a MEMS driver 25 configured to drive the MEMS mirror 12. In particular, the MEMS driver 25 actuates and senses the rotation position of the mirror, and provides position information (e.g., tilt angle or degree of rotation about the rotation axis) of the mirror to the system controller 23. The system controller 23 may use the position information for processing the reflected/received light to generate image data.

A drive voltage (i.e., an actuation or driving signal) is applied by the MEMS driver 25 to an actuator structure of the MEMS mirror 12 to driver the oscillation of the MEMS mirror 12. The drive voltage may be referred to as a high-voltage (HV). The actuator structure may include interdigitated finger electrodes made of interdigitated mirror combs and frame combs to which a drive voltage (i.e., an actuation or driving signal) is applied by the MEMS driver 25. The drive voltage applied to the actuator structure creates a driving force between, for example, interdigitated mirror combs and the frame combs, which creates a torque on the mirror body about the rotation axis. The drive voltage can be switched or toggled on and off (HV on/off) resulting in an oscillating driving force. The oscillating driving force causes the mirror to oscillate back and forth on its rotation axis between two extrema. The drive voltage may be a constant drive voltage, meaning that the drive voltage is the same voltage when actuated (i.e., toggled on). However, it will be understood that the drive voltage is being toggled on and off in order to produce the mirror oscillation. Depending on the configuration, this actuation can be regulated or adjusted by adjusting the drive voltage off time, a voltage level of the drive voltage, or a duty cycle.

In other embodiments, an electromagnetic actuator or a piezoelectric driven actuator may be used to drive the MEMS mirror 12. For an electromagnetic actuator, a driving current (i.e., an actuation or driving signal) may be used to generate the oscillating driving force. Thus, it will be appreciated that drive/driving voltage and drive/driving current may be used interchangeably herein to indicate an actuation signal or a driving signal, and both may generally be referred to as a driving force.

As the mirror oscillates, the capacitance between the finger electrodes changes according to the mirror's rotation position. The MEMS driver 25 is configured to measure the capacitance between the interdigitated finger electrodes, and determine a rotation position or angle position of the MEMS mirror 12 therefrom. By monitoring the capacitance, the MEMS driver 25 can detect the zero-crossing events and a timing thereof, and can determine the tilt angle of the MEMS mirror 12 at any given moment. The MEMS driver 25 can also use the measured capacitance to determine a mirror frequency, and record the information in memory at the MEMS driver 25 or at the system controller 23.

The sensing of the position of the MEMS mirror 12 is performed based on a detector that is configured to measure the capacitance. For example, as the MEMS mirror moves, the geometry of the finger structure changes, resulting in a change in the geometry of the capacitance. As the geometry of the capacitance changes, the capacitance itself changes.

Thus, a specific capacitance corresponds directly with a specific position (i.e., tilt angle) of the MEMS mirror. By sensing the capacitance of the finger structure, the MEMS driver 25 can monitor and track the oscillations of the mirror, and determine a specific position of the MEMS mirror, including the zero-crossing.

One way to measure the capacitance is to measure a current flowing through the finger structure, convert the measured current into a voltage, and then further correlate the voltage to a capacitance and/or a rotation angle. However, any method to measure the capacitance may be used. A rotation direction (e.g., positive or negative, left-to-right or right-to-left, clockwise or counter-clockwise, etc.) is also detected by measuring a change in capacitance over time, where a positive or a negative change indicates opposing rotation directions. The MEMS driver 25 can also record the currents and voltages measured during the measuring of the capacitance. Thus, increasing the accuracy of position sensing of the mirror may improve the overall accuracy of the LIDAR system Since the mirror is driven at a scanning frequency (e.g., 2 kHz), when the mirror rotates in a first rotation direction (e.g., left-to-right or clockwise), it crosses a zero position (i.e., 0°) at a certain point of time. The same can be said when the mirror rotates in a second rotation direction (e.g., right-to-left or counter-clockwise), the mirror will cross the zero position at a certain point in time. These instances of crossing the zero position may be referred to as zero-crossing events which occur at zero-crossing times.

The MEMS mirror 12 is a mechanical moving mirror (i.e., a MEMS micro-mirror) integrated on a semiconductor chip (not shown). The MEMS mirror 12 according to this embodiment is configured to rotate about either a single scanning axis (i.e., a 1D MEMS mirror) or two scanning axes (i.e., a 2D MEMS mirror) that are typically orthogonal to each other. As a 2D MEMS mirror, the MEMS mirror 12 may be a Lissajous scanner that is configured to control the steering of the laser beams in two dimensions (e.g., in horizontal and vertical directions).

It will be further appreciated that a LIDAR scanning system may include multiple scanning mirrors 12 in a Lissajous scanning system (i.e., a 2×1D system), where a first 1D MEMS mirror has a single scanning axis for steering a light beam in a horizontal scanning direction and a second 1D MEMS mirror has a single scanning axis for steering the light beam in a vertical scanning direction. Thus, the two MEMS mirrors in a Lissajous scanning system are mounted at a same location in a vehicle, for example, and are configured to scan a same field of view.

Hence, a transmission technique includes transmitting the beams of light into the field of view from a transmission mirror that continuously oscillates about one or more scanning axes such that the beams of light are projected into the field of view that moves across the field of view as the transmission mirror changes the transmission direction. One or more embodiments may use two resonant scanning axes. In the event that line scanners are used, the scanning pattern may not be a Lissajous pattern, but instead may generate a different type of pattern.

Upon impinging one or more objects, the transmitted light is reflected by backscattering back towards the LIDAR scanning system 100 as reflected light. As will be described in more detail below, the MEMS mirror 12 receives the reflected light and directs the reflected light onto a photodetector 15 via a beam splitter device. The photodetector 15 receives the reflected light and is configured to generate electrical measurement signals. The electrical measurement signals may be used by the systems controller 23 for generating a 3D map of the environment and/or other object data based on the reflected light (e.g., via FFT calculations and processing).

The receiver unit 22 includes the MEMS mirror 12, the photodetector 15, as well as a receiver circuit 24 that includes an analog readout circuit that is configured to read out measurement signals received from the photodetector 15. The same MEMS mirror may be shared for the transmitter and the receiver. Alternatively, the transmitter and the receiver may use different MEMS mirrors. Alternatively, only the transmitter has a MEMS mirror while the receiver is non-scanning.

The photodetector 15 can be any of a number of photodetector types; including avalanche photodiodes (APD), photocells, and/or other photodiode devices. Imaging sensors such as charge-coupled devices (CCDs) can be the photodetectors. In the examples provided herein, the photodetector 15 may be a single pixel photodetector (e.g., a single APD), a 1D APD array that comprises an array of APD pixels arranged in one dimension, or a two-dimensional (2D) APD array that comprises an array of APD pixels arranged in two dimensions. As noted above, the photodetector 15 may be a 1D array that includes a single column of photodiodes.

The photodetector 15 receives reflective light pulses as the receiving line RL and generates electrical signals in response thereto. The distance of objects can be calculated either via the time difference between sent and received laser pulses or laser frequency chirps. A depth map can plot the distance information.

The receiver circuit 24 may receive the analog electrical signals from the photodetectors of the photodetector 15 and transmit the electrical signals as raw analog data to the system controller 23 for processing. The receiver circuit 24 may also receive trigger control signals from the system controller 23 that triggers an activation of one or more photodetectors. The receiver circuit 24 may also receive gain setting control signals for controlling the gain of one or more photodetectors.

The system controller 23 uses the received data to calculate time-of-flight information for each field position within the field of view, to generate object data (e.g., point cloud data), and to generate a 3D point cloud.

Figure 2A:
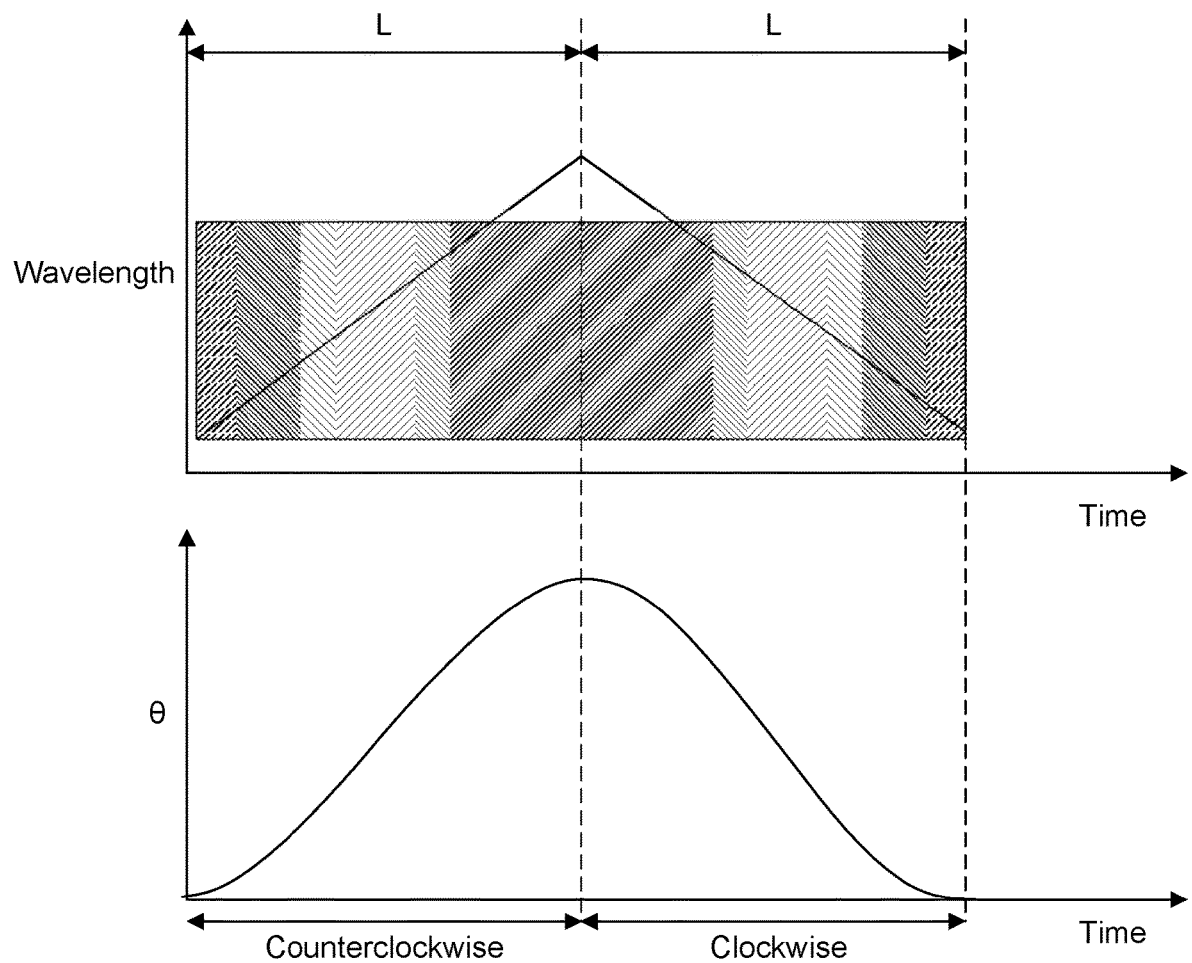
FIG. 2A illustrates a dependency of a frequency of a FMCW light beam based on deflection angle θ of a microelectromechanical system (MEMS) mirror according to one of more embodiments.

FIG. 2A illustrates a dependency of a frequency of a FMCW light beam based on deflection angle θ of a microelectromechanical system (MEMS) mirror according to one of more embodiments. A deflection angle θ may be a tilt angle, a rotation angle, a mirror position, a rotation position, or any other reference to a position of the MEMS mirror with respect to its scanning axis. Hence, these position terms may be used interchangeably herein.

FIG. 2A includes a top diagram and bottom diagram. The top diagram of FIG. 2A shows frequency ramps of a FMCW light beam used for FMCW ranging in one or more embodiments. Additionally, a corresponding wavelength component is shown that changes with the change in frequency of a ramp. The frequency ramps includes a forward ramp (up-ramp) portion and a backward ramp (down-ramp) portion. Thus, different frequencies/wavelengths are transmitted at different times.

The bottom diagram of FIG. 2A shows an example of a deflection angle θ of a MEMS mirror over time as the MEMS mirror performs a scanning operation, with a movement of the MEMS mirror being from right-to-left (i.e., counterclockwise) during the forward ramp of the frequency ramp and being from left-to-right (i.e., clockwise) during the backward ramp of the frequency ramp. Both the frequency of the FMCW light beam and the deflection angle θ of the MEMS mirror are constantly changing over time. Thus, different frequencies/wavelengths of the FMCW light beam are incident on the MEMS mirror at different transmission times and/or at different deflection angles θ.

A length L of the frequency ramp is equivalent to an amount of time (i.e., a duration) it takes for the frequency to change from a minimum frequency to a maximum frequency or vice versa. The length L of the forward ramp (up-ramp) portion and the backward ramp portion may be equal. Thus, one triangle wave interval is 2L in duration. It is also to be noted that the length L, and consequently a length of a triangle wave interval, of the frequency ramp is adjustable by a controller of the FMCW LIDAR system. For example, the system controller 23 can adjust the length L of the ramp to cover a certain segment of the full FOV. In this way, the length L of the ramp can be synchronized with the MEMS mirror motion, particularly with an angular sub-range of the full range of motion of the MEMS mirror 12 about its scanning axis. For example, each frequency ramp of the FMCW light beam may be mapped to a specific angular sub-range and the continuous change of the frequency of a ramp is synchronized with a continuous change of the deflection angle within the angular sub-range. A sensing circuit may be further provided to sense a rotational or deflection position (e.g., the rotation angle θ of the MEMS mirror) in order to provide further feedback information to the controller in order to aid in the synchronization.

Figure 2B:
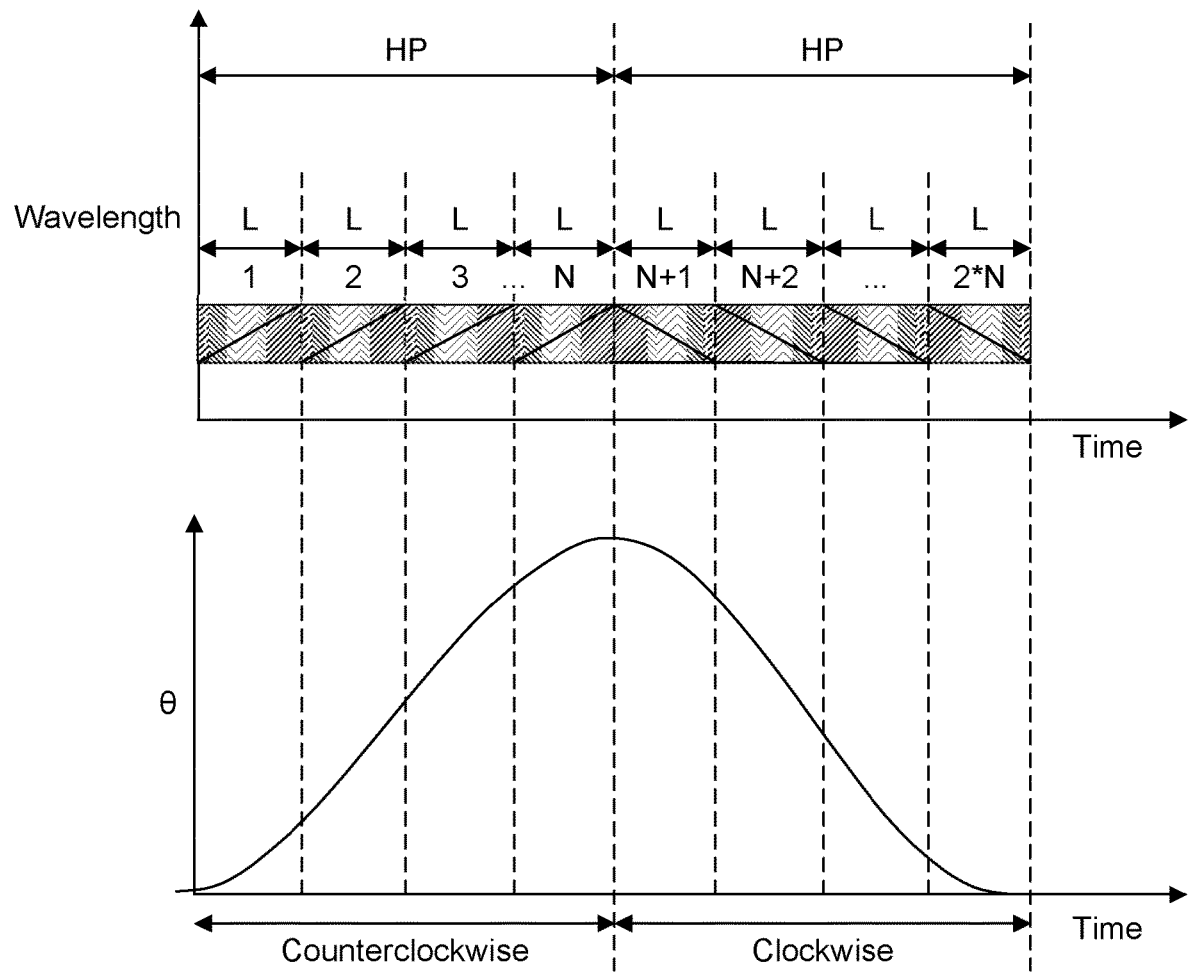
FIG. 2B illustrates a further dependency of a frequency of a FMCW light beam based on deflection angle θ of a microelectromechanical system (MEMS) mirror according to one of more embodiments.

FIG. 2B illustrates a further dependency of a wavelength (frequency) of a FMCW light beam based on deflection angle θ of a microelectromechanical system (MEMS) mirror according to one of more embodiments. FIG. 2B includes a top diagram and bottom diagram.

The top diagram of FIG. 2B shows a series or plurality of frequency ramps of a FMCW light beam used for FMCW ranging in one or more embodiments. The frequency ramps include a series of N forward ramps (up-ramps) and a series of N backward ramps (down-ramps), wherein N is an integer greater than zero and a total number of frequency ramps over a full period of a MEMS mirror motion is 2N. Thus, different wavelengths are transmitted at different times.

The bottom diagram of FIG. 2B shows a deflection angle θ of a MEMS mirror over time as the MEMS mirror performs a scanning operation, with a movement of the MEMS mirror being from right-to-left (i.e., counterclockwise) during the forward ramp of the frequency ramp and being from left-to-right (i.e., clockwise) during the backward ramp of the frequency ramp. Both the wavelength of the FMCW light beam and the deflection angle θ of the MEMS mirror are constantly changing over time. Thus, different wavelengths of the FMCW light beam are incident on the MEMS mirror at different transmission times and/or at different deflection angles θ.

In particular, multiple ramps can fit into a half period HP of the MEMS mirror motion. In this case, a series of consecutive N forward ramps are generated during a first half period of one period of the MEMS mirror motion, and a series of consecutive N backward ramps are generated during a second half period of the same period of the MEMS mirror motion. The two series of consecutive N ramps may also be reversed such that the series of consecutive N backward ramps are generated during the first half period and the series of consecutive N forward ramps are generated during the second half period. Nevertheless, in one period, the series of consecutive N forward ramps and the series of consecutive N backward ramps are contiguous in that the last ramp in the first series and the first ramp in the second series join at a maximum deflection angle of the MEMS mirror to form a triangle.

It is at the maximum deflection angle that the MEMS mirror alters its direction of motion. In other words, a light beam transmitter changes the direction of the ramps from forwards to backwards or from backwards to forwards at the maximum deflection angle of the MEMS mirror. The pattern of forward and backward frequency ramps then repeats for the next MEMS mirror motion period.

Alternatively, as will be demonstrated below, the direction of the frequency ramps may be changed during a mirror movement in the same direction. For example, a backward ramp may be consecutive to a forward ramp, or vice versa, as the MEMS mirror is moving from left-to-right. Thus, the directional change of the ramps need not occur at a maximum or minimum deflection angle.

Additionally, each frequency ramp has a length L that is equivalent to an amount of time (i.e., a duration) it takes for the wavelength to change from a minimum wavelength to a maximum wavelength or vice versa. Here, a mirror period can be defined as 2N*L.

The length L of the frequency ramps is adjustable by a controller of the FMCW LIDAR system. For example, the system controller 23 can adjust the slope and thus the length L of the ramps according to the scanning frequency of the MEMS mirror. In this way, the length L of the ramps can be synchronized with the MEMS mirror motion. Particularly, the system controller 23 can assign (i.e., map) and synchronize each ramp with a sub-range or segment of the full angular range of the MEMS mirror, as is shown in FIG. 2B. This angular sub-range or segment further corresponds to a sub-range or segment of the full field of view (FOV). Thus, FOV regions within the full FOV are mapped to angular sub-ranges that are mapped to a frequency ramp (i.e., FOV regions are mapped to a frequency ramp). For example, the first frequency ramp is synchronized to a first angular sub-range of the MEMS mirror motion, the second frequency ramp is synchronized to a second angular sub-range of the MEMS mirror motion, and the frequency ramp N is synchronized to an Nth (last) angular sub-range of the MEMS mirror motion in the clockwise direction. In each angular sub-range, the transmitter 21 varies (i.e., ramps) the frequency (or wavelength) in synchronization with change in the deflection angle of the MEMS mirror. As a result, the continuous change of the frequency is synchronized with a continuous change of the deflection angle. Thus, the frequency changes in step with the deflection angle of the MEMS mirror.

As noted above, the resolution of the FMCW LIDAR system 100 is affected by the movement speed of the MEMS mirror 12. Not only may the movement speed depend on the scanning frequency, but it also depends on the angular position of the MEMS mirror through its motion. For example, the movement speed of the MEMS mirror 12 is highest at the zero angle (i.e., the zero-crossing) and lowest at its two maximum deflection angles where the mirror changes direction. Thus, movement speed can be said to be dependent on the angular position of the MEMS mirror 12 about a scanning axis.

The MEMS driver 25 is configured to measure the angular position and transmit the angular position information to the system controller 23. In turn, the system controller 23 is configured to adjust the chirp rate of a frequency ramp (i.e., a change in the instantaneous slope of the frequency ramp) based on the angular position of the MEMS mirror 12. In this case a maximum chirp rate of the frequency ramp is mapped to a zero tilt angle and a minimum chirp rate of the frequency ramp is mapped to the maximum tilt angles. This applies for both up-chirps (forward ramps) and down chirps (backward ramps). The system controller 23 is configured to generate chirp rate configuration information based on the measured mirror position and sends the chirp rate configuration information to the illumination unit 10. The system controller 23 may further send the chirp rate configuration information to the receiver signal processing circuit for compensating the processing of the sensor data. The illumination unit 10 is configured to adjust the chirp rate according to the received chirp rate configuration information.

In particular, the chirp rate is adjusted in direct correlation to the movement speed based on the angular position of the MEMS mirror 12 on its scanning axis. Thus, the chirp rate is increased to a maximum chirp rate (maximum slope) at the zero-crossing and the chirp rate is decreased to a minimum chirp rate (minimum slope) at the two maximum deflection angles.

As a result, the chirp rate may continuously decrease as the angular position of the MEMS mirror changes from the zero angle, where the mirror is flat, to one of the maximum deflection angles. Similarly, the chirp rate may continuously increase as the angular position of the MEMS mirror changes from one of the maximum deflection angles to the zero angle. The change in the chirp rate may result in the frequency ramps to be triangular or parabolic.

It will also be understood that chirp rate can be dynamically changed during a scanning operation. The change in the chirp rate during a currently active chirp can based on positional measurements acquired during a previous chirp (i.e., the most recent chirp prior to the chirp being transmitted) or based on real-time positional measurements taken during the currently active chirp. The aim is that each chirp covers the same sub-range of the FOV (i.e., the same angular range) while the MEMS mirror 12 moves. Thus, the resolution of the LIDAR system 100 stays the same over the full FOV.

In the former case of using positional measurements acquired during a previous chirp, a previous chip and a current chirp are transmitted consecutively. The system controller 23 may determine a rate of change of the MEMS mirror position during the previous chirp for calculating a chip rate variance to be applied to the current chirp.

As a further benefit, a varying chirp rate hardens against interference from other FMCW LIDAR transmissions from other systems or other transmitters. Thus, the LIDAR system 100 is more robust against interference from other LIDAR beams.

It was further noted above that some FMCW LIDAR systems require both up-chirp and down-chirp FMCW beams. Both up and down-chirps have to hit the same target to calculate the speed and distance of the target. For example, while distance of a target may be determined using one chirp, a speed determination is not possible without both up and down-chirps hitting the target. However, an angular range that includes a first angular-subrange (i.e., a first sub-FOV) for one chirp and a second angular-subrange (i.e., a second sub-FOV) for the other chirp may be result in one of the chirps missing the target.

Figure 3:
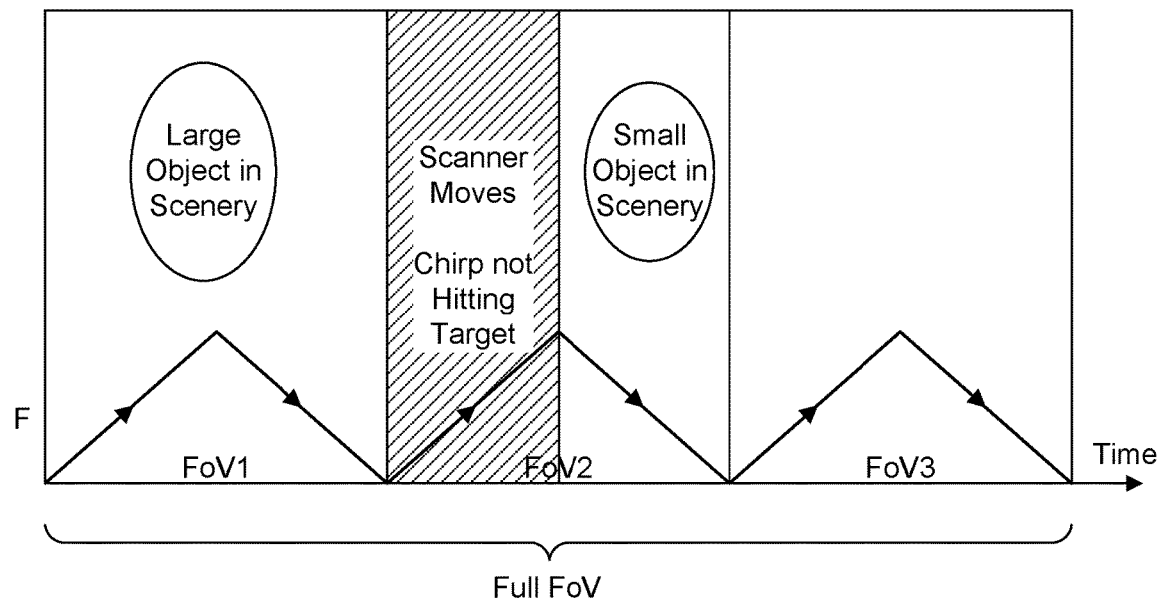
FIG. 3 shows an illustration of FMCW light beams transmitted as up-chirps (forward ramps) and down-chirps (backward ramps) into a segmented FOV according to a conventional technique.

FIG. 3 shows an illustration of FMCW light beams transmitted as up-chirps (forward ramps) and down-chirps (backward ramps) into a segmented FOV according to a conventional technique. Directional arrows are used to indicated wither a ramp is an up-chirp with increasing frequency for a down-chirp with decreasing frequency f. In this example, the full FOV is segmented into three sub-FOVs, including FOV 1, FOV 2, and FOV 3. The scenery projected in the full FOV includes a large object and a small object that are targets of the LIDAR system. As time increases, the MEMS mirror 12 rotates about its scanning axis from left to right to scan the full FOV. Thus, each sub-FOV corresponds to a different angular sub-range of the MEMS mirror 12 about its scanning axis. Furthermore, each forward ramp and backward ramp corresponds to a different angular sub-range and do not overlap in the angular range at which they are transmitted.

Here, to scan a sub-FOV (e.g., FOV 1, FOV 2, or FOV 3), two consecutive chirps (up-chirp and down-chirp) are used. In the case of the large object located in FOV 1, both up and down-chirps are able to hit the object. However, in the case of the small object in FOV 2, the up-chirp misses the object and only the down-chirp hits. Thus, the system controller 23 is unable to calculate the speed of the small object. Since speed is used to calculate the trajectory of an object, the trajectory also cannot be calculated.

According to the further embodiments described herein, the system controller 23 is configured to modify the FMCW laser shoot pattern of the up-chirps and down-chirps such that up-chirps and down-chirps from different scanner movements form a pair and match their FOV. In other words, an up-chirp is paired with a down-chirp from different mirror scans such that they both cover (i.e., overlap with) the same sub-angular range of the full FOV. Furthermore, unlike conventional methods, an up-chirp and a down-chirp of an up-down-chirp pair are not shot consecutively in a same scan, but are instead shot during different scans.

A scan is defined as a scanning movement of the MEMS mirror 12 about its scanning axis in one direction. Thus, a first scan may be defined as a movement of the MEMS mirror from left-to-right (i.e., clockwise) that occurs during a first scanning period and a second scan may be defined as a movement of the MEMS mirror from right-to-left (i.e., counterclockwise) that occurs during a second scanning period. The first and the second scanning periods may be consecutive or nonconsecutive to each other. However, in order to implement nonconsecutive scans, a greater amount of memory may be required and processing times may be increased due to delays caused by increasing the temporal separation of an up chirp and a down chirp of a pair.

Thus, an up-down-chirp pair comprising an up-chirp and a down chirp is formed by an up-chirp that is transmitted as the MEMS mirror 12 rotates about its scanning axis in a first scan direction and by a down-chirp that is transmitted as the MEMS mirror 12 rotates about its scanning axis in a second scan direction that is opposite to the first scan direction. Moreover, as noted above, the same sub-angular range is covered by both the up-chirp and the down-chirp of the pair. Thus, the two chirps are fired at the same positional range of the MEMS mirror 12 about its scanning axis and cover a same portion of the full FOV (i.e., they are fired at the same transmission directions that correspond to the sub-angular range of the MEMS mirror 12.

Figure 4:
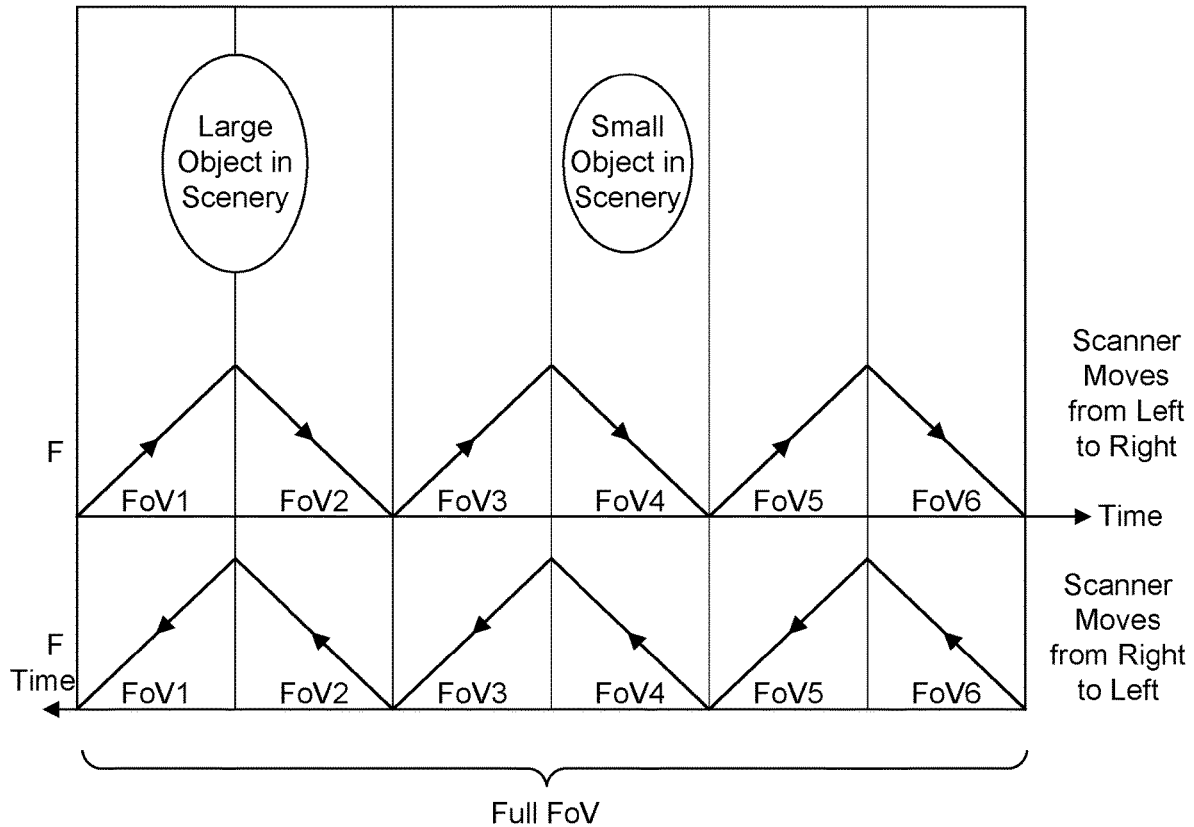
FIG. 4 shows an illustration of FMCW light beams transmitted as up-chirps (forward ramps) and down-chirps (backward ramps) into a segmented FOV according to one or more embodiments.

FIG. 4 shows an illustration of FMCW light beams transmitted as up-chirps (forward ramps) and down-chirps (backward ramps) into a segmented FOV according to one or more embodiments. Two consecutive mirror scans are shown with time increasing from left to right for a left-to-right scan and with time increasing from right to left for a right-to-left scan. The FOV segments FOV 1-FOV 6 each correspond to a length of a frequency ramp. In addition, each FOV segment includes an up-chirp and a down-chirp that form an up-down-chirp pair.

In this case, the first scanning period of the first scan and the second scanning period of the second scan are consecutive to each other (i.e., the second scan immediately follows the first scan). However, in another embodiment the scans may be nonconsecutive to each other.

Additionally, each FOV segment corresponds to a particular angular range of the MEMS mirror 12 about its scanning axis. Thus, an up-down-chirp pair is assigned by the system controller 23 to a same angular range of the MEMS mirror 12 about its scanning axis. For example, if the MEMS mirror 12 rotates between +/−15°, an up-down-chirp pair may be assigned to an angular range of −15° to −10°, −10° to −5°, −5° to 0°, 0° to 5°, 5° to 10°, or 10° to 15°. The width of angular ranges is entirely configurable and is not limited to 5°, and in practice the width of the angular range may be 1° or less. Thus, the smaller the resolution, the more FOV segments and the more ramps that are used. It will be understood that each FOV segment may be referred to as a sub-FOV or region of interest (ROI) in the FOV and that these terms can be used interchangeably.

In this example, during each scanning movement, alternating up-chirps and down-chirps are generated. Thus, an up-chirp is consecutive to a down-chirp, and vice versa. Each consecutive chirp of a same scan covers a different FOV segment and is assigned to a different angular range of the MEMS mirror 12 about the scanning axis.

As a result, for a 1D scanner, up-chirp of FOV_n is shot when the MEMS mirror 12 moves from left to right and a down-chirp of FOV_n is shot when the mirror moves from right to left and when the same FOV_n (i.e., same angular range about the scanning axis) is reached, where n is an integer.

For a 2D Lissajous scanner, an up-chirp is shot at a certain FOV_n and a corresponding down-chirp is shot when the Lissajous pattern crosses the same FOV_n (from opposite direction, diagonal, etc.) or when the next Lissajous frame crosses the same FOV_n. Since 2D scanners use two orthogonal scanning axis, a FOV segment is defined by both an angular range of a first axis and an angular range of a second axis, where both angular ranges define a FOV of interest within the full FOV. Up and down chirps of a pair are shot when the angular ranges on both axes are satisfied at nonconsecutive moments in time. That is, just like in the 1D scanning method, the up and down chirps of a pair are generated during different scans for 2D scanning.

The system controller 23 is configured to process the reflected light beams originating from an up-down-chirp pair together to generate both speed and direction information of a hit target. Thus, the system controller 23 tracks the angular information received from the MEMS driver 25, and matches reflected signals for processing that originate from an up-down-chirp pair that correspond to the same angular range based on the tracked angular information.

Thus, a FMCW laser shoot pattern is realized that assigns up-chirp and down-chirp shoots to certain FOVs. The result is doubling the LIDAR's resolution at the cost of framerate and memory.

Figure 5:
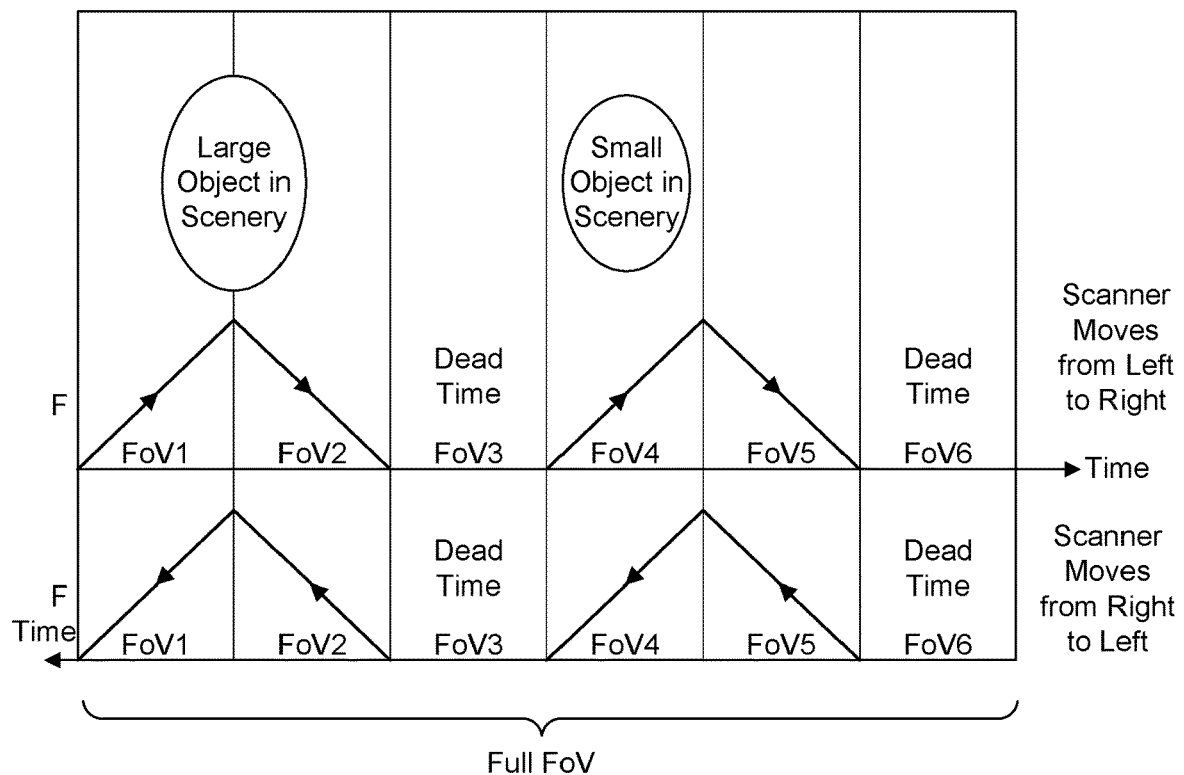
FIGS. 5-7 show additional illustrations of FMCW light beams transmitted as up-chirps (forward ramps) and down-chirps (backward ramps) into a segmented FOV according to one or more embodiments.
Figure 6:
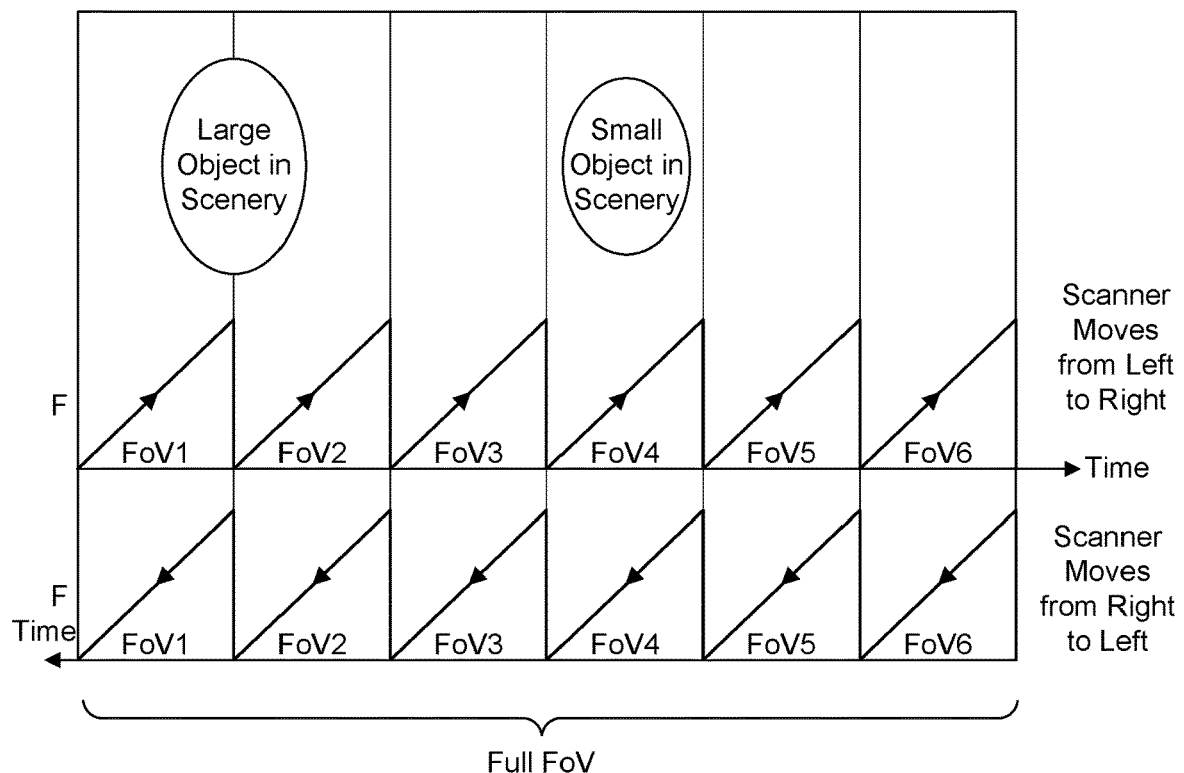
Figure 7:
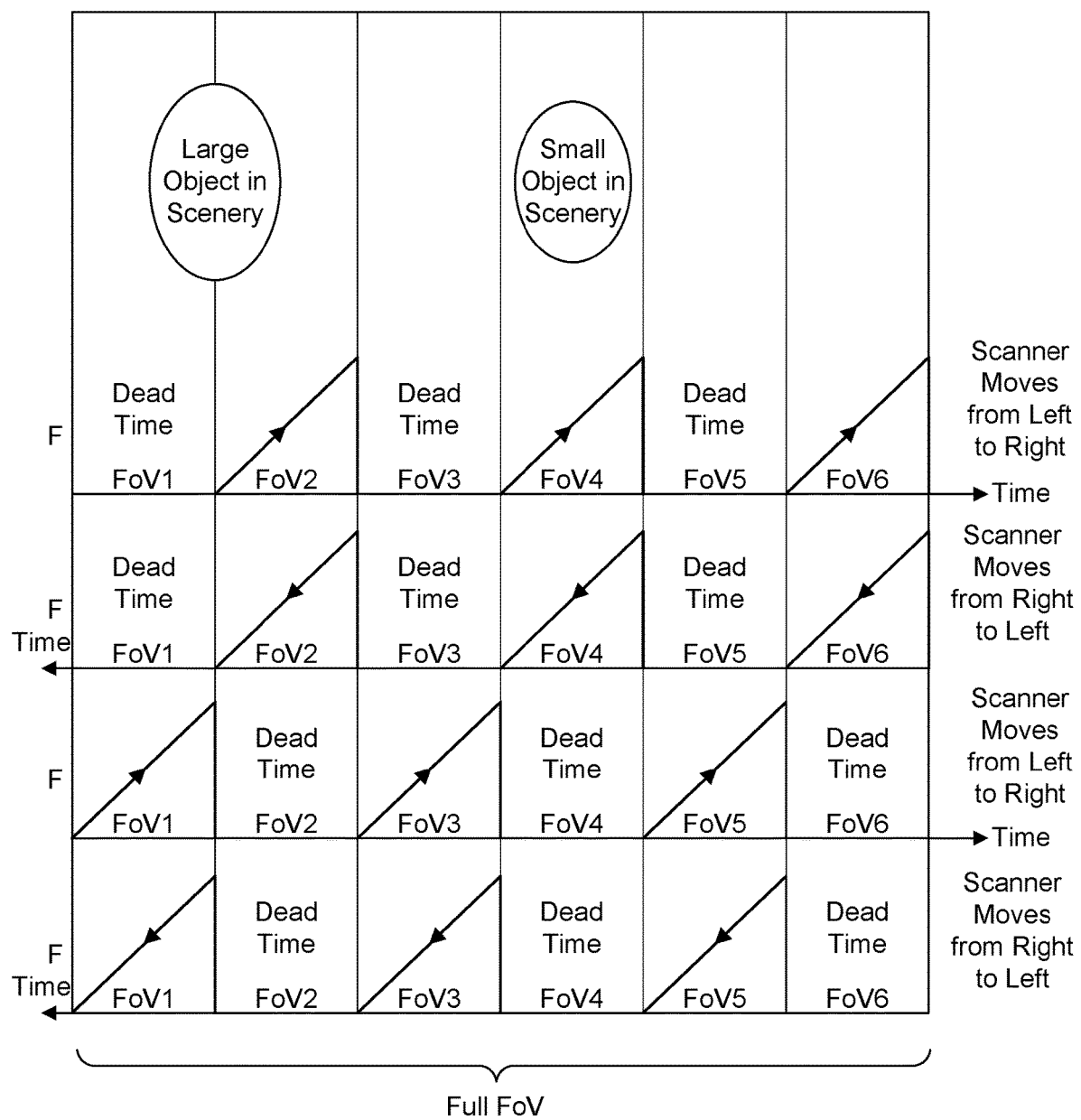

FIGS. 5-7 show additional illustrations of FMCW light beams transmitted as up-chirps (forward ramps) and down-chirps (backward ramps) into a segmented FOV according to one or more embodiments. In particular, FIGS. 5-7 follow a similar principle of using up-down-chirp pairs that are assigned to same angular ranges as described in reference to FIG. 4, but use different laser shoot patterns to achieve this based on different system requirements.

Scans that are shown as being consecutive to each other may also be reconfigured to be nonconsecutive to each other.

However, in order to implement nonconsecutive scans, a greater amount of memory may be required and processing times may be increased due to delays caused by increasing the temporal separation of an up chirp and a down chirp of a pair.

For example, in some cases, FMCW lasers cannot be arbitrarily started or stopped and/or only support certain dead times between ramps. In these embodiments, the system controller 23 set and adapts the FMCW laser shoot pattern to accommodate a dead time in such a way that up-chirp and down-chirp pair of a FOV-of-interest overlap with one another.

For example, in FIG. 5, a dead time is implemented in FOV segments FOV 3 and FOV 6. The dead time is provided after consecutive up and down-chirps of a scan and each dead time of one scanning movement is matched and aligned a corresponding deadtime of the opposite scanning movement. Thus, the system controller 23 assigns dead times to specific angular ranges of the MEMS mirror 12 about its scanning axis.

In FIG. 6, consecutive up-chirps are generated during a first scan and consecutive down-chirps are generated during a second scan that moves in the opposite direction to the first scan. The up-chirp and down-chirp that overlap in the same sub-FOV (i.e., the same angular range) form an up-down-chirp pair, and their corresponding reflected signals are processed together.

In FIG. 7, a dead time is inserted between each ramp and the dead times of two consecutive scans in opposite directions are matched to the same sub-FOV. After the first two consecutive scans, the dead time is shifted to different sub-FOVs. In particular, for the second two consecutive scans, ramps are generated in the sub-FOVs in which dead times were assigned for the first two consecutive scans, and dead times are now used in the sub-FOVs in which ramps were assigned for the first two consecutive scans. Thus, ramps and dead times swap places such that the full FOV can be scanned while still implementing dead times and up-down-chirp pairs that are assigned to the same angular range. As a result, four scans are needed to scan the full FOV.

In view of the above, the FMCW laser shoot pattern is adapted by assigning up-chirp and down-chirp shoots to a same region of interest (ROI) of the FOV and processing data of an up-down-chirp pair together in order to calculate both speed and distance of an object. This double the LIDAR system's resolution at the cost of framerate and memory.

Although embodiments described herein relate to a MEMS device with a mirror, it is to be understood that other implementations may include optical devices other than MEMS mirror devices, including other oscillating structures, including those not related to LIDAR. In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer, or an electronic circuit. In some embodiments, some one or more of the method steps may be executed by such an apparatus.

It is further to be noted that methods disclosed in the specification or in the claims may be implemented by a device having means for performing each of the respective acts of these methods. Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application-specific integrated circuits (ASICs), field programmable logic arrays (FPGAs), programmable logic controller (PLC), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure. A control unit may use electrical signals and digital algorithms to perform its receptive, analytic, and control functions, which may further include corrective functions. Such hardware, software, and firmware may be implemented within the same device or within separate devices to support the various techniques described in this disclosure.

One or more aspects of the present disclosure may be implemented as a non-transitory computer-readable recording medium having recorded thereon a program embodying methods/algorithms for instructing the processor to perform the methods/algorithms. Thus, a non-transitory computer-readable recording medium may have electronically readable control signals stored thereon, which cooperate (or are capable of cooperating) with a programmable computer system such that the respective methods/algorithms are performed. The non-transitory computer-readable recording medium can be, for example, a CD-ROM, DVD, Blu-ray disc, a RAM, a ROM, a PROM, an EPROM, an EEPROM, a FLASH memory, or an electronic memory device.

Although various embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A scanning system, comprising:
  a transmitter configured to transmit a frequency modulated continuous wave (FMCW) light beam into a field of view, wherein the FMCW light beam comprises a plurality of frequency ramps that have a chirp rate that is variable;

a scanning structure configured to rotate about a scanning axis such that a deflection angle of the scanning structure continuously varies over time, wherein the scanning structure is configured to scan the field of view with the FMCW light beam;
a measurement circuit configured to measure the deflection angle of the scanning structure as the deflection angle varies over time and generate position information based on the measured deflection angle; and
a controller configured to vary the chirp rate of the plurality of frequency ramps based on the position of the scanning structure,
wherein the controller is configured to receive the position information during a transmission of a frequency ramp and change the chirp rate of the frequency ramp in real-time based on the position information, or
wherein the controller is configured to receive the position information during a transmission of a previous frequency ramp and change the chirp rate of a subsequent frequency ramp based on the position information corresponding to the previous frequency ramp.

2. The scanning system of claim 1, wherein the chirp rate is an instantaneous slope of a frequency ramp.

3. The scanning system of claim 1, wherein:
the scanning structure is configured to rotate between a maximum deflection angle and a zero deflection angle,
wherein the controller is configured to vary the chirp rate between a maximum value that is synchronized with the zero deflection angle and a minimum value that is synchronized with the maximum deflection angle.

4. The scanning system of claim 3, wherein:
the controller is configured to continuously vary the chirp rate between the maximum value and the minimum value based on the position information.

5. The scanning system of claim 1, wherein:
the scanning structure is configured to rotate from a first maximum deflection angle to a second maximum deflection angle, with a zero deflection angle therebetween,
wherein the controller is configured to vary the chirp rate between a maximum value that is synchronized with the zero deflection angle and a minimum value that is synchronized with the first maximum deflection angle and the second maximum deflection angle.

6. The scanning system of claim 1, wherein the deflection angle of the scanning structure continuously varies over time between a minimum deflection angle and a maximum deflection angle, and wherein the chirp rate continuously decreases as the deflection angle varies from the minimum deflection angle to the maximum deflection angle and continuously increases as the deflection angle varies from the maximum deflection angle to the minimum deflection angle.

7. A method of compensating a scanning system, the method comprising:
transmitting a frequency modulated continuous wave (FMCW) light beam into a field of view, wherein the FMCW light beam comprises a plurality of frequency ramps having a chirp rate that is variable;
driving a scanning structure to rotate about a scanning axis such that a deflection angle of the scanning structure continuously varies over time, wherein the scanning structure is configured to scan the field of view with the FMCW light beam;
measuring the deflection angle of the oscillator structure as the deflection angle varies over time;
generating position information indicating a position of the scanning structure based on the measured deflection angle; and
varying the chirp rate of the plurality of frequency ramps based on the position of the scanning structure,
wherein the position information is received during a transmission of a frequency ramp and the chirp rate of the frequency ramp is varied in real-time based on the position information, or
wherein the position information is received during a transmission of a previous frequency ramp and the chirp rate of a subsequent frequency ramp is varied based on the position information corresponding to the previous frequency ramp.

8. The method of claim 7, wherein:
the scanning structure is configured to rotate between a maximum deflection angle and a zero deflection angle, and
varying the chirp rate of the plurality of frequency ramps includes varying the chirp rate between a maximum value that is synchronized with the zero deflection angle and a minimum value that is synchronized with the maximum deflection angle.

9. The method of claim 8, wherein:
varying the chirp rate of the plurality of frequency ramps includes continuously varying the chirp rate between the maximum value and the minimum value based on the position information.

10. A scanning system, comprising:
a transmitter configured to transmit a frequency modulated continuous wave (FMCW) light beam into a field of view, wherein the FMCW light beam comprises a plurality of frequency ramps including up-chirps and down-chirps that are matched into up-down chirp pairs, each up-down chirp pair including one up-chirp and one down-chirp;
a scanning structure configured to oscillate about a scanning axis such that a deflection angle of the scanning structure continuously varies over time, wherein the scanning structure is configured to oscillate in an angular range between a first maximum deflection angle and a second maximum deflection angle; and
a controller configured to:
segment the angular range into a plurality of sub-angular ranges,
assign each up-down chirp pair of the FMCW light beam to a different sub-angular range of the plurality of sub-angular ranges, and
synchronize transmissions of the one up-chirp and the one down-chirp of each up-down chirp pair with the assigned sub-angular range based on a position of the scanning structure,
wherein each up-down chirp pair comprises an up-chirp transmitted in an assigned sub-angular range during a first scanning movement of the scanning structure and a down-chirp transmitted in the assigned sub-angular range during a second scanning movement of the scanning structure,
wherein position information indicating a position of the scanning structure is received during a transmission of a frequency ramp and a chirp rate of the frequency ramp is varied in real-time based on the position information, or
wherein the position information is received during a transmission of a previous frequency ramp and a chirp rate of a subsequent frequency ramp is varied based on the position information corresponding to the previous frequency ramp.

11. The method of claim 7, wherein the deflection angle of the scanning structure continuously varies over time between a minimum deflection angle and a maximum deflection angle, and wherein the chirp rate continuously decreases as the deflection angle varies from the minimum deflection angle to the maximum deflection angle and continuously increases as the deflection angle varies from the maximum deflection angle to the minimum deflection angle.

12. The scanning system of claim 10, wherein:
the scanning structure is configured to scan the field of view with the FMCW light beam using a plurality of scanning movements during which the scanning structure rotates from the first maximum deflection angle to the second maximum deflection angle or rotates from the second maximum deflection angle to the first maximum deflection angle.

13. The scanning system of claim 12, wherein:
the plurality of scanning movements includes a first scanning movement and a second scanning movement,
the first scanning movement is such that the scanning structure rotates from the first maximum deflection angle to the second maximum deflection angle in a first scanning period, and
the second scanning movement is such that the scanning structure rotates from the second maximum deflection angle to the first maximum deflection angle in a second scanning period.

14. The scanning system of claim 13, wherein the second scanning period is consecutive to the first scanning period.

15. The scanning system of claim 10, wherein the plurality of sub-angular ranges are sized according to a segment size and a length of each frequency ramp is synchronized with the segment size.

16. The scanning system of claim 15, wherein the length of each frequency ramp corresponds to a time duration each of the plurality of frequency ramps takes to transition between a minimum frequency and a maximum frequency.

17. The scanning system of claim 10, wherein an up-chirp and a down chirp of an up-down chirp pair is transmitted at a same region of interest in the field of view that is defined by the assigned sub-angular range.

18. The scanning system of claim 16, wherein lengths of an up-chirp and a down chirp of an up-down chirp pair are synchronized with a size of the assigned sub-angular range.

19. The scanning system of claim 10, wherein the controller is configured to control a length of the up-chirps and the down-chirps in order to synchronize the length with their assigned sub-angular range.

20. The scanning system of claim 10, wherein:
the first scanning movement includes a first dead time during which the transmitter does not transmit the FMCW light beam,
the second scanning movement includes a second dead time during which the transmitter does not transmit the FMCW light beam, and
wherein the controller is configured to assign the first dead time and the second dead time to a same sub-angular range.

21. The scanning system of claim 10, further comprising:
a measurement circuit configured to measure the deflection angle of the scanning structure as the deflection angle varies over time and generate the position information indicating the position of the scanning structure based on the measured deflection angle.

22. A method of compensating a scanning system, the method comprising:
transmitting, by a transmitter, a frequency modulated continuous wave (FMCW) light beam into a field of view, wherein the FMCW light beam comprises a plurality of frequency ramps including up-chirps and down-chirps that are matched into up-down chirp pairs, each up-down chirp pair including one up-chirp and one down-chirp;
driving a scanning structure to oscillate about a scanning axis such that a deflection angle of the scanning structure continuously varies over time, wherein the scanning structure is configured to oscillate in an angular range between a first maximum deflection angle and a second maximum deflection angle;
segmenting the angular range into a plurality of sub-angular ranges;
assigning each up-down chirp pair of the FMCW light beam to a different sub-angular range of the plurality of sub-angular ranges, wherein each up-down chirp pair comprises an up-chirp transmitted in an assigned sub-angular range during a first scanning movement of the scanning structure and a down-chirp transmitted in the assigned sub-angular range during a second scanning movement of the scanning structure;
determining a position of the scanning structure as the scanning structure oscillates about the scanning axis; and
controlling the transmitter to transmit each up-down chirp pair at their assigned sub-angular range based on the position of the scanning structure,
wherein position information indicating a position of the scanning structure is received during a transmission of a frequency ramp and a chirp rate of the frequency ramp is varied in real-time based on the position information, or
wherein the position information is received during a transmission of a previous frequency ramp and a chirp rate of a subsequent frequency ramp is varied based on the position information corresponding to the previous frequency ramp.

23. The method of claim 22, wherein driving the scanning structure to oscillate about the scanning axis comprises:
driving the scanning structure using a plurality of scanning movements during which the scanning structure rotates from the first maximum deflection angle to the second maximum deflection angle or rotates from the second maximum deflection angle to the first maximum deflection angle.

24. The method of claim 23, wherein the plurality of scanning movements includes a first scanning movement and a second scanning movement,
wherein the first scanning movement corresponds to the scanning structure rotating from the first maximum deflection angle to the second maximum deflection angle in a first scanning period, and
wherein the second scanning movement corresponds to the scanning structure rotating from the second maximum deflection angle to the first maximum deflection angle in a second scanning period.

* * * * *

UNITED STATES PATENT AND TRADEMARK OFFICE
CERTIFICATE OF CORRECTION

| | | |
|---|---|---|
| PATENT NO. | : 12,210,122 B2 | Page 1 of 1 |
| APPLICATION NO. | : 17/003154 | |
| DATED | : January 28, 2025 | |
| INVENTOR(S) | : Norbert Druml | |

It is certified that error appears in the above-identified patent and that said Letters Patent is hereby corrected as shown below:

In the Claims

In Claim 1, Column 15, Line 9, "based on the measured deflection angle; and" should be changed to -- indicating a position of the scanning structure based on the measured deflection angle; and --.

In Claim 7, Column 16, Line 1, "measuring the deflection angle of the oscillator structure" should be changed to -- measuring the deflection angle of the scanning structure --.

Signed and Sealed this
Fourth Day of March, 2025

Coke Morgan Stewart
*Acting Director of the United States Patent and Trademark Office*